United States Patent [19]

Sunahara et al.

[11] 4,313,854

[45] Feb. 2, 1982

[54] OXIDE-COATED CATHODE FOR ELECTRON TUBE

[75] Inventors: Kazuo Sunahara; Akira Misumi, both of Mobara, Japan

[73] Assignee: Hitachi, Ltd., Tokyo, Japan

[21] Appl. No.: 91,840

[22] Filed: Nov. 6, 1979

[30] Foreign Application Priority Data

Nov. 15, 1978 [JP] Japan ............................ 53-139903

[51] Int. Cl.$^3$ ............................................ A01B 1/04

[52] U.S. Cl. ............................ 252/516; 313/346 R; 252/512; 252/513; 252/514; 252/515; 252/517; 252/518; 252/519; 252/520; 252/521

[58] Field of Search ............... 252/516, 513, 521, 515, 252/514, 517, 519, 520, 512, 518; 313/346 R, 346 DC

[56] References Cited

U.S. PATENT DOCUMENTS

| | | | |
|---|---|---|---|
| 2,716,716 | 8/1955 | Hughes et al. | 313/346 DC |
| 2,848,644 | 8/1958 | Koppius | 313/346 DC |
| 3,170,772 | 2/1965 | Sato et al. | 313/346 DC |
| 3,500,106 | 3/1970 | Berchtold | 313/346 R X |
| 3,719,856 | 3/1973 | Koppius | 313/346 R |
| 3,842,309 | 10/1974 | Van Stratum et al. | 313/346 DC |
| 3,879,830 | 4/1975 | Buescher | 252/521 X |
| 4,081,713 | 3/1978 | Misumi | 252/521 X |
| 4,101,800 | 7/1978 | Thomas et al. | 313/346 DC |
| 4,147,954 | 4/1979 | Tuck | 313/346 DC |

*Primary Examiner*—J. L. Barr

*Attorney, Agent, or Firm*—Craig and Antonelli

[57] ABSTRACT

An oxide-coated cathode for electron tubes comprising a base metal plate made of an alloy containing nickel as a major component and at least one high-melting point metal in an amount of 2% by weight or more, and if required, a small amount of one or more reducing elements, and an electron emissive alkaline earth metal oxide layer adhered to the base metal plate, characterized by having a carbide layer made of at least one carbide of Si, B, Ti, Zr, Hf, V, Nb, Ta, Mo or W between the base metal plate and the electron emissive alkaline earth metal oxide layer can maintain electron emitting life for a long period of time due to the prevention of interfacial reaction between the base metal layer and the alkaline earth metal oxide layer.

8 Claims, 3 Drawing Figures

OXIDE-COATED CATHODE FOR ELECTRON TUBE

Figure 1:
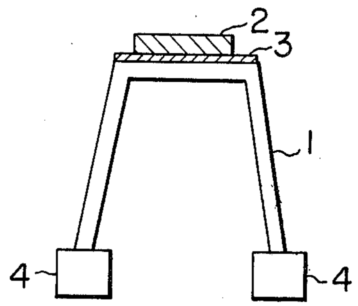

This invention relates to an oxide-coated cathode for electron tubes, and more particularly it relates to an improved oxide-coated cathode using as its base metal an Ni alloy containing a high-melting point metal or metals such as W, Mo, Re, Ta and the like.

Recently, in order to shorten the time required till electron emission takes place after turn-on of power switch in an electron tube provided with an oxide-coated cathode, attempts have been made, for example, to reduce the thickness of the base metal plate for decreasing the heat capacity of the cathode or to use a so-called directly heated type cathode in which the base metal is directly heated by feed of an electric current. In such cases, the base metal is required to have higher high-temperature strength than required in the conventional devices, so that alloys containing a high-melting point metal or metals such as W, Mo, Re, Ta, etc., are used as base metal in place of the conventional base metals containing Ni and small quantities of reducing elements.

These high-melting point metals, however, are more apt to be oxidized than Ni, so that when an oxide-coated cathode is produced by using an alloy containing a high-melting point metal as base metal according to an ordinary method, the high-melting point metal is oxidized and there takes place a rapid and violent reaction at the interface of the high-melting point metal oxide and the alkaline earth metal oxides or alkaline earth carbonates. Such interfacial reaction rate and the amount of the reaction product far exceed those of the reaction between the conventional base metal containing Ni and trace amounts of reducing elements and the alkaline earth oxides (hereinafter referred to simply as "oxides"). If such an interfacial reaction occurs massively between the base metal and said oxides, there resultantly come out various problems, such as a wide change in the state of contact between the base metal and the oxides, resulting in peel-off of the oxides from the base metal, or insufficient contact between the oxides and the base metal to cause drop of the temperature of the oxide layer during the cathode operation, resulting in unsatisfactory electron emission from the oxides. These are the vital defects for an electron tube cathode.

On the other hand, the following references are cited for showing the state of the art: Japanese patent application Kokai (Laid-Open) Nos. 91642/77 and 27350/79 and Japanese patent application Kokoku (Post-Exam Publn) Nos. 22295/73 and 1764/51.

An object of this invention, therefore, is to provide an oxide-coated cathode for electron tubes which is free of said defects and also is protected against any interfacial reaction between the oxides and the base metal to maintain a long-time life for electron emission.

There is provided according to this invention an improved oxide-coated cathode for electron tubes comprising a base metal plate made of an alloy comprising nickel as its main component and 2% by weight or more of at least one high-melting point metal, and an electron emissive alkaline earth metal oxide layer coated on said base metal plate, characterized in that a carbide layer made from at least one of carbides of Si, B, Ti, Zr, Hf, V, Nb, Ta, Mo and W is provided between said base metal plate and electron emissive alkaline earth metal oxide layer.

Figure 2:
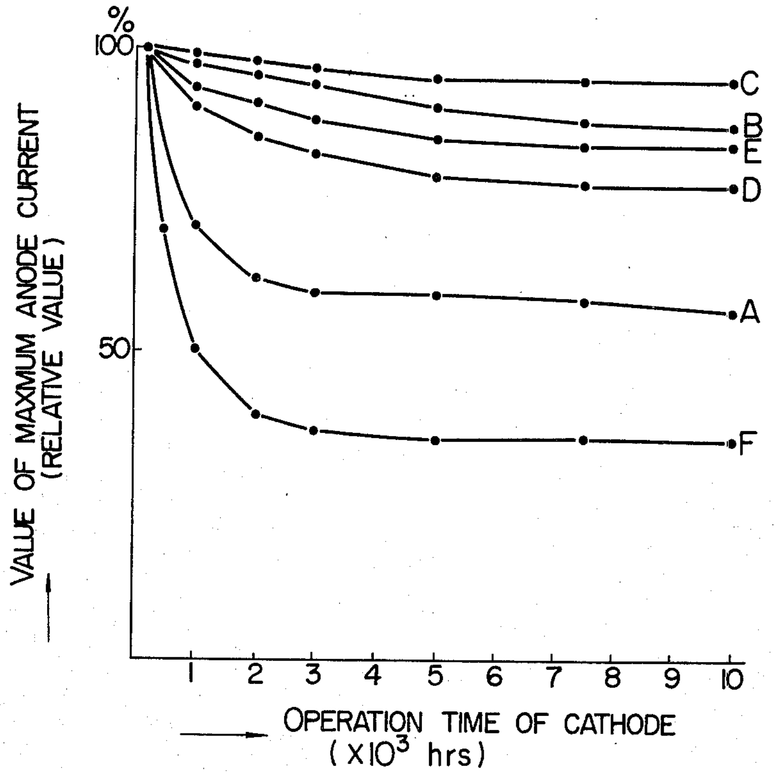
Figure 3:
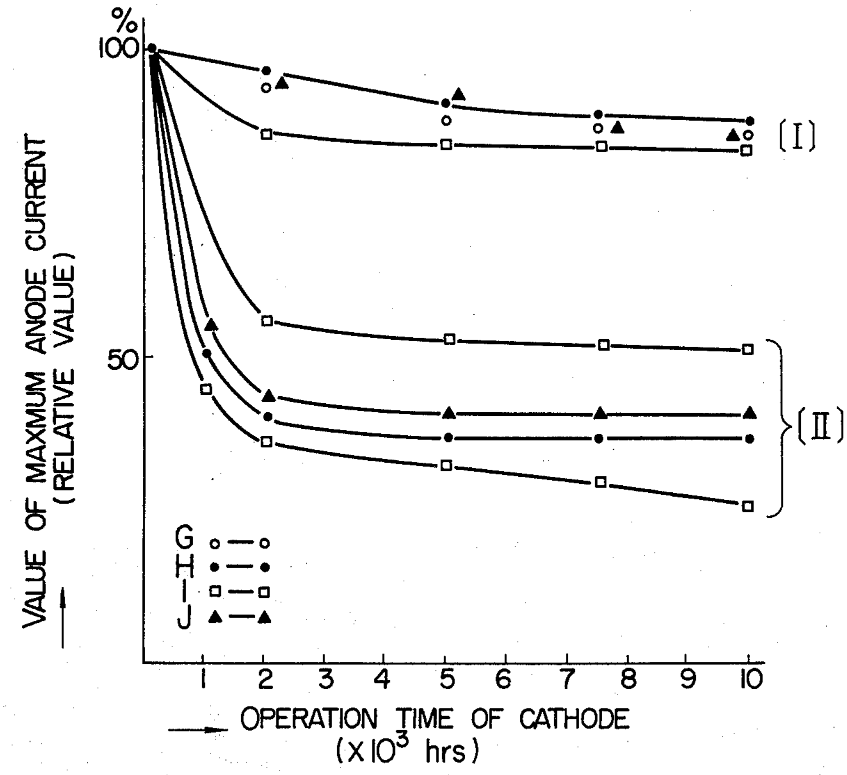

In the accompanying drawings,

FIG. 1 is a sectional view of an oxide-coated cathode for electron tubes according to this invention; and FIGS. 2 and 3 are graphs showing the relationship between the value of maximum anode current and operation time of an oxide-coated cathode of this invention in practical use thereof.

The base metal constituting the oxide-coated cathode for electron tube according to this invention is made of an alloy comprising 2% by weight or more of at least one high-melting point metal such as W, Mo, Re, Ta, etc., and where necessary small quantities of reducing elements such as Zr, Mg, Si, etc., the remainder being Ni. Preferred examples of such alloys are shown below. (Figures in the parentheses are weight percents of the respective elements).

Ni-W-Mg: (72.4:27.5:0.1)
Ni-WMo-Mg: (80.9:2.0:17.0:0.1)
Ni-W-Re-Mg: (82.9:2.0:15.0:0.1)
Ni-W-Mo-Re-Mg: (80.1:2.0:15.8:2.0:0.1)
Ni-W-Si: (72.4:27.5:0.1)
Ni-W-Mo-Si: (80.9:2.0:17.0:0.1)
Ni-W-Re-Si: (82.9:2.0:15.0:0.1)
Ni-W-Mo-Re-Si: (80.1:2.0:15.8:2.0:0.1)
Ni-W-Zr: (72.1:27.5:0.4)
Ni-W-Mo-Zr: (80.6:2.0:17.0:0.4)
Ni-W-Re-Zr: (82.6:2.0:15.0:0.4)
Ni-W-Mo-Re-Zr: (79.8:2.0:15.8:2.0:0.4)

One or more other reducing elements such as Al, Ti, U, Cr, Nb, Th, etc., can be used together with or in place of above-said elements Zr, Mg and Si.

In the case of Zr, it is usually contained in an amount of 5% by weight or less and 0.02% by weight or more in the base metal, and in the case of other reducing elements, they may be contained in an amount substantially equal to usual impurity loadings in the base metal.

The high-melting point metal needs to be used in an amount of at least 2% by weight; any smaller amount than that amount can not provide the desired high-temperature strength and electrical specific resistance. Upper limit of the amount of such a high-melting point metal is its solid solubility limit in nickel and when a plurality of such metals are used, upper limit of total amounts of such metals is their solid solubility limit in nickel as a whole and decided by giving due considerations to their properties, workability and other factors.

Coated on the base metal plate is at least one of the carbides of such metals as Si, B, Ti, Zr, Hf, V, Nb, Ta, Mo, W, etc., and then an alkaline earth metal oxide layer is further coated thereon by a usual method to thereby constitute an oxide-coated cathode.

Referring here to FIG. 1, there is shown a side elevational view of one embodiment of oxide-coated cathode for electron tube according to this invention. In the drawing, numeral 1 denotes a base metal plate, 2 an alkaline earth metal oxide layer, 3 a carbide layer, and 4 terminals connected to a power source not shown.

The carbide layer can be formed by using the common film-forming techniques, for example a so-called reactive vacuum evaporation method in which at least one of the elements Si, B, Ti, Zr, Hf, V, Nb, Ta, Mo and W is subjected to electron beam evaporation coating in a hydrogen gas (such as $C_2H_2$ or $C_2H_4$) atmosphere. Mere existence of such a carbide layer can provide the desired effect, but if the layer is too thin such layer may be formed in patches on the base metal surface and prove unsatisfactory for repressing the interfacial reaction between the base metal and the alkaline earth metal oxides. Therefore, when mass production is to be considered, the thickness of said carbide layer is preferably in the range of 50–5,000 Å, more preferably 100–1,000 Å. If the carbide layer thickness exceeds 5,000 Å, the base metal surface is perfectly covered by the carbide layer to weaken the oxide reducing action by the reducing elements in the base metal, resulting in insufficient electron emission from the cathode. For this reason, the carbide layer thickness is preferably 5,000 Å or less and more preferably within the range of 100–1,000 Å. In the latter case, the chemically stable carbide layer can repress any radical interfacial reaction between the base metal and the oxides and reducing action by the reducing elements in the base metal against the oxides can be conducted moderately so that there can be obtained stabilized high-quality cathodes.

In the case of a base metal plate comprising Ni as its main component plus small quantities of high-melting point metals such as W, Mo, Re, Ta, etc., since the oxide layer is usually liable to peel off from the metal plate, it is generally practiced to first coat the base metal plate surface with powder of a metal or metal alloy such as Ni, Ni-Co, Ni-W, Ni-Mo, Ni-Re, etc., and then further provide thereon the oxide layer. In such a case, a carbide layer may be provided on the metal powder which coats the base metal plate. In the cathode of such structure, the carbide layer prevents the metal powder from flowing out onto the base metal plate surface to inhibit occurence of any reaction between the metal powder and the interfacial reaction product, thereby eliminating the risk of metal powder quality change and deformation which usually occur while prolonging the service life of the cathode.

The invention is now described in more detail by way of the following examples.

EXAMPLE 1

Each of five different kinds of carbide layers, referred to as A, B, C, D and E as shown in Table 1 below, was coated on the surface of a base metal plate made of an alloy comprising 0.4% by weight of Zr, 27.5% by weight of W and remaining percents of Ni. There was also prepared a specimen F with no carbide layer. Then these specimens were further coated with an alkaline earth metal oxide layer according to a known method to form oxide-coated cathodes. The carbide layer coating was formed by a so-called reactive vacuum evaporation method in which a metal such as Zr, Ti, etc., is coated by means of electron beam evaporation in a $C_2H_2$ atmosphere under a pressure of $5\times10^{-4}$ Torr. Each of the thus prepared oxide-coated cathodes was incorporated in a color television picture tube and the operating time dependency of the maximum anode current was measured. In the graph of FIG. 2, the ratio of the maximum anode current to the initial value is plotted as ordinate and the cathode operation time as abscissa. Letters A–F in FIG. 2 correspond to the specimens A–F in Table 1.

TABLE 1

| Specimen | Kind of carbide | Thickness of carbide layer (A) |
|---|---|---|
| A | ZrC | 30 |
| B | ZrC | 600 |
| C | ZrC | 6000 |
| D | TiC | 50 |
| E | TiC | 200 |
| F | — | 0 |

As is clear from FIG. 2, specimens B, D and E have very excellent characteristics, and among them, specimens B and E are better than D. It is also seen that specimen C, i.e. a cathode with a thick carbide layer, is minimized in deterioration of the ratio of the maximum anode current to the initial value, but it should be noted that, in this case, the initial value itself is too small as shown in Table 2, that is to say, the specimen C lacks the electron emitting performance from the very beginning and can not stand practical use as a cathode for electron tubes. A properties improving effect will be also noted in specimen A with a small carbide layer thickness in comparison with specimen F which has no carbide layer. In the cathode with no carbide layer, a sharp decrease of electron emission takes place during the operation. F in FIG. 2 represents a cathode having no carbide layer, in which case marked deterioration of electron emitting performance is noted. These results show very high availability of this invention for electron tubes.

TABLE 2

| Specimen | Initial anode current |
|---|---|
| A | o |
| B | o |
| C | x |
| D | o |
| E | o |
| F | o |

(Note)
o: normal
x: insufficient

EXAMPLE 2

A 200–600 Å thick carbide (ZrC) layer was formed on each of four kinds of base metal plates, represented by G, H, I and J, respectively, as shown in Table 3, and then an alkaline earth metal oxide layer was further coated thereon, in the same way as Example 1. Each of the thus obtained oxide-coated cathodes was set in a color television picture tube and the operating time dependency of the maximum anode current was measured, obtaining the results shown in FIG. 3. In FIG. 3, [I] represents the case where a carbide layer was provided and [II] represents the case where no carbide layer was provided.

TABLE 3

| Specimen | Composition of base metal |
|---|---|
| G | Si 0.07% wt., W 2% wt., Re 15% wt., Ni 82.93% wt. |
| H | Zr 0.4% wt., W 27.5% wt., Ni 72.1% wt. |
| I | Mg 0.1% wt., W 2% wt., Mo 17% wt., Ni 80.9% wt. |
| J | Ni power was sticked on the base metal of specimen H |

As is clear from FIG. 3, the cathodes provided with a carbide layer of a suitable thickness according to this invention, as shown by [I] in the same figure, are minimized in deterioration of electron emission in use even if the base metal composition is changed widely. On the other hand, the cathodes with no carbide layer, as represented by [II] in FIG. 3, are greatly affected by the base metal composition and also suffer sharp drop of electron emission in use. Thus, the carbide layer of this invention, as applied for an oxide-coated cathode using a base metal containing a high-melting point metal or metals, produces a remarkable improving effect irrespective of certain changes in the base metal composition.

Although the invention has been described by way of the embodiments where the reactive vacuum evaporation in a hydrocarbon gas atmosphere was used for forming the carbide layer, it is also possible to employ other methods such as for example a reactive sputtering method where a metal target is sputtered in a hydrocarbon gas, a normal sputtering method using a carbide target, or a chemical vapor deposition (CVD) method in which a mixture of a halide gas such as $ZrCl_4$ or $TiCl_4$ and a hydrocarbon or hydrogen gas is supplied to the heated base material to obtain a carbide coating.

In FIG. 1, the carbide layer is formed only on the oxide coated area and its vicinity, but it may be formed over a wider area for better workability. Also, in the foregoing examples of this invention, a carbide layer made of only one kind of carbide is coated on the base metal plate surfaces, but such carbide layer may be formed from sublayers of two or more different kinds of carbides, or it may be of a single- or multiple-layer structure formed from a mixture of two or more different kinds of carbides.

As described above, the oxide-coated cathode for electron tube provided according to this invention is capable of preventing deterioration of electron emitting performance in its use to maintain a regulated electron emission rate for a long time and can also realized marked improvements in quality, reliability and other operational characteristics of the electron tube.

What is claimed is:

1. In an oxide-coated cathode for electron tubes comprising a base metal plate made of an alloy containing nickel as a major component and at least one high-melting point metal in an amount of 2% by weight or more, and an electron emissive alkaline earth metal oxide layer adhered to the base metal plate, the improvement which comprises having a carbide layer made of at least one carbide of Si, B, Ti, Zr, Hf, V, Nb, Ta, Mo or W between the base metal plate and the electron emissive alkaline earth metal oxide layer, said carbide layer having a thickness sufficient for repressing an interfacial reaction between the base metal plate and the alkaline earth oxide layer and being not more than 5000 Å.

2. An oxide-coated cathode for electron tubes according to claim 1, wherein the base metal plate is made of an alloy that further contains at least one reducing element selected from the group consisting of Zr, Al, Mg, Si, Ti, U, Cr, Nb, and Th.

3. An oxide-coated cathode for electron tubes according to claim 1, wherein a layer formed from powder of a metal or an alloy selected from Ni, Ni-Co, Ni-W, Ni-Mo and Ni-Re is provided between the base metal plate and the carbide layer.

4. An oxide-coated cathode for electron tubes according to claim 2, wherein a layer formed from powder of a metal or an alloy selected from Ni, Ni-Co, Ni-W, Ni-Mo and Ni-Re is provided between the base metal plate and the carbide layer.

5. An oxide-coated cathode for electron tubes according to claim 1, 2, 3 or 4, wherein the thickness of carbide layer is in the range of 50–5,000 Å.

6. An oxide-coated cathode for electron tubes according to claim 1, 2, 3 or 4, wherein the thickness of carbide layer is in the range of 100–1,000 Å.

7. An oxide-coated cathode for electron tubes according to claim 1, 2, 3 or 4, wherein said carbide layer is a ZrC or TiC layer.

8. An oxide-coated cathode for electron tubes according to claim 1, wherein said high-melting point metal is W, Mo, Re, or Ta.

* * * * *